Nov. 1, 1960  L. G. SIMJIAN  2,958,269
RECEIPT GIVING APPARATUS
Filed May 8, 1959  2 Sheets-Sheet 1
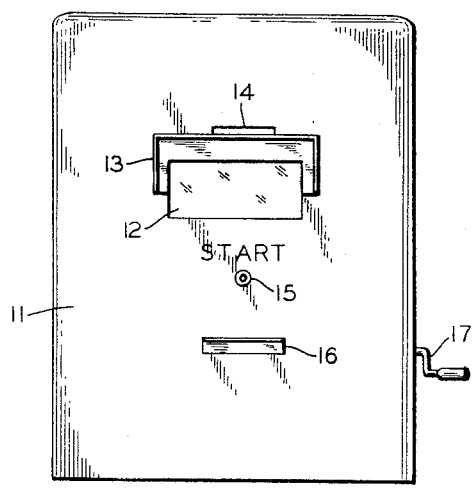
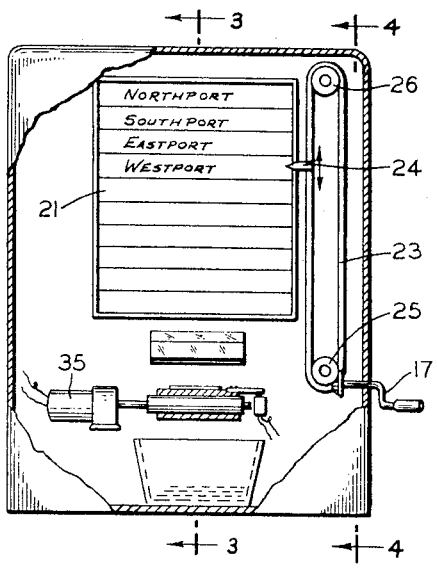
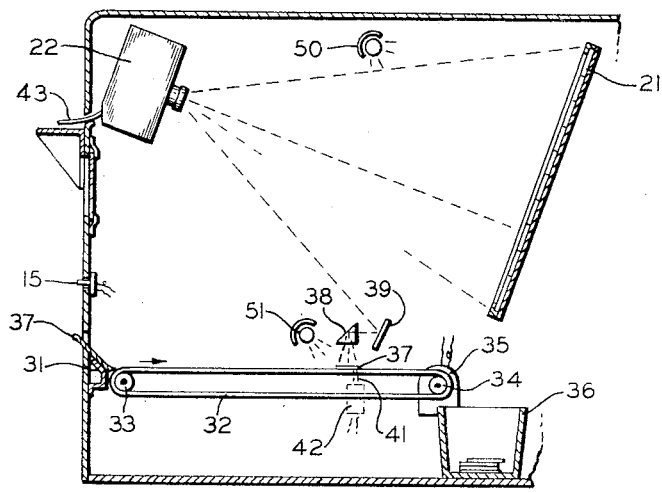
INVENTOR
LUTHER G. SIMJIAN
BY  *Ervin B. Steinberg*
    agent Nov. 1, 1960     L. G. SIMJIAN     2,958,269
RECEIPT GIVING APPARATUS
Filed May 8, 1959     2 Sheets-Sheet 2

INVENTOR
LUTHER G. SIMJIAN
BY Ervin B. Steinberg
agent

United States Patent Office 2,958,269
Patented Nov. 1, 1960

2,958,269

RECEIPT GIVING APPARATUS

Luther G. Simjian, Laurel Lane, Greenwich, Conn.

Filed May 8, 1959, Ser. No. 811,958

8 Claims. (Cl. 95—1.1)

This invention in general refers to a receipt-giving apparatus and, more particularly, has reference to an apparatus which accepts a deposit for storage and issues in return a receipt which exhibits an image of the deposit, together with information displayed to the depositor and selected by the depositor to be associated with the deposit.

The invention has reference also to an apparatus which displays a plurality of information with provision for the depositor to select certain information. The depositor is required to insert into the apparatus a deposit commensurate with the information selected. The apparatus then renders to the depositor a receipt which shows the information selected, together with an image of the deposit. In this manner, the apparatus provides a receipt which has recorded thereon the selected information associated with the image of the deposit.

The apparatus disclosed hereafter in more detail, as will be apparent to those skilled in the art, is ideally suited as a self-service station for dispensing fare tickets, tickets at race tracks, trip insurance and similar articles.

One of the objects of this invention, therefore, is the provision of an apparatus which accepts a deposit and dispenses a receipt, the receipt carrying an image of the deposit.

Another object of this invention is the provision of an apparatus which accepts a deposit and issues a receipt identifying the deposit and the displayed information in associated relationship.

A further object of this invention is the provision of an apparatus displaying to the depositor a plurality of information whereby the depositor is required to select a certain type of information, this information being apparent on the issued receipt.

A further and other object of this invention is the provision of an apparatus which accepts a deposit and displays selectable information whereby a receipt is issued to the depositor, the receipt exhibiting a photographic image of the deposit and of the selected information.

Further and still other objects of this invention will be apparent by reference to the following description taken in conjunction with the accompanying drawings in which:

Figure 1 is a front elevational view of the apparatus;

Figure 2 is a front elevational view with the front panel partly cut away;

Figure 3 is a sectional view along lines 3—3 in Figure 2;

Figure 4:
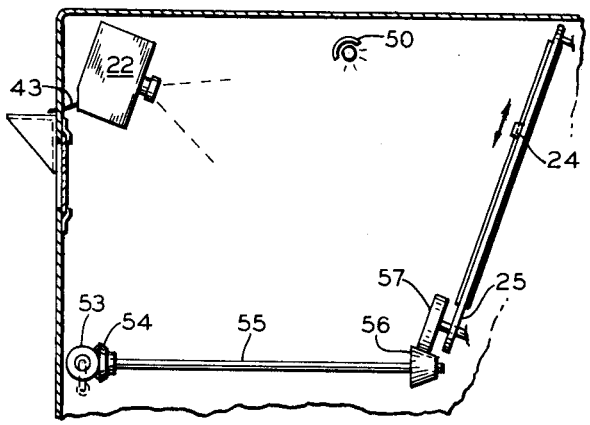
Figure 4 is a sectional view along lines 4—4 of Figure 2.

Referring now to the figures and Figure 1 in particular, a depositor using the apparatus faces a front panel 11 which contains a transparent window 12 disposed at approximately eye level so that the depositor may view information displayed within the apparatus. Window 12 is surrounded by a light shield 13, on the top thereof being disposed an aperture 14 through which a receipt is issued to the depositor. The depositor faces also a start push button 15, an aperture 16 by means of which a deposit is inserted into the apparatus and a crank 17 which serves to select the desired information displayed to the depositor via window 12.

Figures 2 and 3 reveal the internal mechanisms of the instant apparatus, showing a display panel 21 which displays in horizontal spaces selectable data or information, for instance, a plurality of destinations, a plurality of numbered post positions at a race, etc. This information is visible to the depositor by means of transparent window 12 and is seen also by an image recording means 22 disposed above the transparent window. When turning crank 17, a belt 23 with marker 24 fastened thereto is driven about a set of vertically spaced rollers 25 and 26 so that the depositor is able to indicate his selection by placing marker 24 opposite the selected information.

A deposit such as money, check, coupon, or similar article of value is inserted in the apparatus via aperture 16 and guided via a shield 31 onto a conveying belt actuates switch 42 which in turn causes operation driven by a motor 35. As the deposit advances from the aperture on the left, Figure 3, toward storage receptacle 36 on the right, deposit 37 also comes in the view of the image recording means 22 by means of suitably placed prism 38 and reflecting mirror 39.

As deposit 37 reaches the position where it is in view of the image recording means, a lug 41 attached to the belt actuates switch 42 which in turn causes operation of the image recording means 22. In due course a receipt 43 is issued from recording means 22 via aperture 14 of the front panel. Deposit 37, subsequent to photography, is guided into storage receptacle 36 where it is stored inaccessible to the depositor. Lamps 50 and 51 serve to illuminate the displayed information and the deposit, respectively, as an image thereof is being recorded. It will be apparent that the lamps may either be incandescent lamps, fluorescent lamps which are energized continuously, or become energized shortly before recording means 22 is actuated. Alternately, the lamps may be electronic flash devices as are well known in the art. Depending on the sensitivity of the film and/or the level of illumination, the deposit may be photographed while moving or the belt may be stopped momentarily.

Referring now to Figure 4, the details of the crank mechanism are shown which include a set of bevel gears 53 and 54, a horizontal shaft 55 and a set of friction rollers 56 and 57 which in turn drive roller 25 as explained in conjunction with Figure 2.

The image recording means 22, in one preferred embodiment comprises an apparatus similar or equivalent to the "Microfilm Printer" manufactured by the Minnesota Mining and Manufacturing Co. of St. Paul, Minnesota. This apparatus includes sensitized paper which normally receives a projected image from a microfilm frame and provides within a few seconds an enlarged and finished print of the frame. The apparatus uses a specially prepared paper in conjunction with a solution and electric current to burn a permanent image onto the paper. This machine is electrically actuated by a single push button and is well known in the microfilm art and commercially available. The photographic print 43 expelled by the phtographic recording means 22, therefore, serves as the receipt showing an image of the selected information as well as of the deposit in associated relationship with respect to one another.

In an alternate design, the image recording means 22 comprises a camera of the "Polaroid-Land" type which processes a photographic print within sixty seconds or less, this apparatus being also well known. The only modification necessary in the latter device for the instant application is the addition of a motor-driven film advance, a modification which obviously is within the purview of a person skilled in the art.

Figure 5:
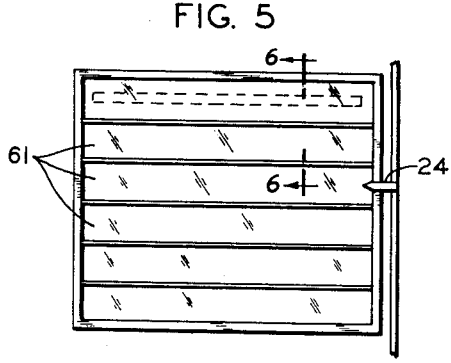
Figure 5 is an elevational view of an alternate design for displaying selectable information.
Figure 6:
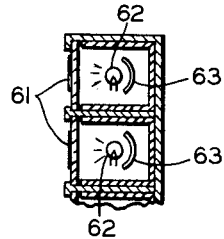
Figure 6 is a sectional view along lines 6—6 of Figure 5.

Figures 5 and 6 show an alternate design for the information which is displayed to the depositor, depicting a rectangular box enclosure which contains a plurality of spaced slidable front panels 61. These front panels are imprinted or screened with the necessary information and may be replaced periodically. A fluorescent tube 62 and reflector disposed in the rear of each display panel illuminate the information so that it is visible and may be photographed. Indicator 24 disposed to the right, Figure 5, is positioned along the panels in the usual manner.

Figure 7:
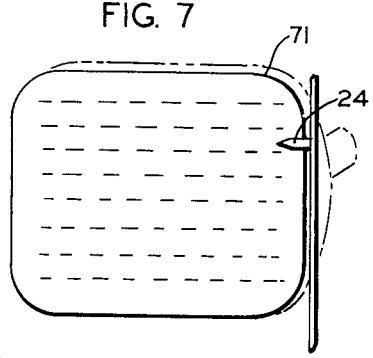
Figure 7 is a front view partly in perspective of still another embodiment of means for displaying selectable information.

Figure 7 is still an alternate design and shows a television display tube 71, the front face of which displays the selectable information. In this manner instant changing of information from a central point is readily accomplished, thus obviating the need for changing each remote apparatus individually whenever a change of information is required.

Several other modifications will readily be apparent to those skilled in the art as will be outlined hereafter. Instead of a single crank 17 there may be mounted a plurality of cranks in order to provide indication of first, second and third choice of selected information. Alternately, a push button or dial arrangement may be provided which lights up the desired information in Figures 5 and 6 or which positions the pointer in Figure 2 by means of a suitable servo mechanism. Additionally, the information which is selectable by the depositor may be projected into the apparatus from a source disposed outside of the enclosure using image projection or other suitable means.

One further modification which readily can be accomplished is a connection between the mechanism which permits the depositor to select the information and the image recording and receipts issuing means 22 which, for instance, provides in the receipt a marking, such as indexing punches, corresponding to the selected information so that the receipt will display an image of the deposit and a mark corresponding to the selected information.

The receipt thus provided is endowed with important safeguards. If the receipt is to serve as a fare ticket, it will be honored or considered valid only if the deposit itself corresponds in value to the selected information. Both information are immediately visible and subject to inspection. Additionally, data such as date, time, window number, etc., may readily be included on the receipt by either stamping thereon or as projected information.

Figure 8:
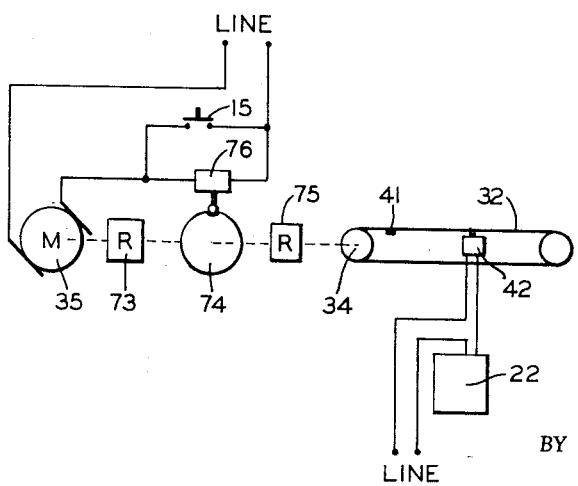
Figure 8 is a schematic circuit diagram for the apparatus.

Figure 8 is a schematic electrical circuit diagram of the instant apparatus, showing motor 35 which is coupled via a gear reducer 73 to a cycling cam 74 and to a gear reducer 75 to drive roller 34 which in turn rotates belt 32. When push button 15 is momentarily closed, motor 35 becomes energized from line voltage and immediately roates cam 74 to close associated switch 76 in order to bypass push button 15 and to cause motor 35 to rotate the cam for one complete revolution. Gear reducer 75, coupled to cam 74 is adjusted to rotate roller 34 for a length of time which corresponds to one revolution of belt 32. Lug 41 is positioned along the belt in such a manner as to operate switch 42 when the deposit 37 is in view of the image recording means 22. Switch 42 in turn actuates image recording means 22 as explained heretofore. If desired, a sensing switch or photoelectric means may be included to establish the presence of a deposit on the belt.

When it is desired that there be a concurrent tally of the selected information, it will be apparent that sensing switches can be arranged to coact with indicator 24. The switches are energized when recording means 22 become actuated, thereby disclosing at a remote location the selected information. The instant device, moreover, may be provided with currency sensing means in order to establish and report, if desired, at the remote station the denomination of the deposit. In this manner, both the selected information as well as the deposit are tallied on a continuing basis in order to totalize the betting at race tracks. Although the prior art discloses several means of sensing the denomination of paper bills, a simplified apparatus is disclosed in copending application for U.S. Letters Patent, Serial No. 706,198, filed December 30, 1957, entitled "Apparatus and Method for Determining the Character of a Document," which is well suited for the instant purpose.

It will be apparent that the apparatus disclosed hereinbefore provides a convenient self-service station for railroad stations, bus terminals, theater ticket agencies, race tracks, etc., where many variables as to destination, selected information, and monetary considerations are present. The apparatus described meets these requirements and issues a receipt which associates the deposit with the selected information while effectively maintaining the identity of the deposit and of the selected information.

While there have been described and illustrated specific embodiments of the present invention, together with certain modifications, it will be obvious to those skilled in the art that various further modifications can be made without departing from the intent and principle of the invention which shall be limited only by the scope of the appended claims.

What is claimed is:

1. A receipt giving apparatus for use by a depositor in combination with information selectable from a plurality of data comprising: an enclosure; selectable information displayed within the enclosure and being visible to the depositor facing the enclosure; a first and second aperture disposed on the wall of said enclosure; the first aperture adapted to receive a deposit from the depositor and the second aperture adapted to issue a receipt to the depositor; image recording and issuing means disposed within said enclosure and adapted to view the information display to the depositor; control means available to the depositor for indicating his selected information from a plurality of display data; a storage receptacle disposed within the enclosure for receiving and storing a deposit; guide means between the first aperture and the storage receptacle for conveying a deposit inserted at the first aperture to the storage receptacle and said guide means arranged so that a deposit being conveyed to the storage receptacle comes into view of said recording means; control means actuated when said deposit is in view of said image recording means to cause said recording means to record an image of the deposit and of the selected information in associated relation with one another, and means issuing said image to the depositor via said second aperture.

2. A receipt giving apparatus as set forth in claim 1 wherein image deflecting means are associated with the image recording means to project an image from the deposit to the image recording means.

3. A receipt giving apparatus for use by a depositor in combination with data selectable by said depositor from a plurality of data and including image recording and issuing means comprising: deposit acceptance means disposed on said apparatus for receiving a deposit from said depositor; means for guiding the deposit from the acceptance means to a storage receptacle which is disposed inaccessible to the depositor; predetermined multiple choice data displayed for viewing by said depositor; means cooperating with said selectable data to enable the depositor to indicate the selected data from said plurality of data; said image recording means disposed to view the deposit received from the depositor and the selected data; control means actuating said recording means to record an image of said deposit and of said selected data in identifiable relationship with one another, and said image issuing means rendering a receipt to the depositor in response to an image of said deposit and of the selected data having been recorded, said receipt bearing an image of the deposit and of the information selected by the depositor as viewed by said recording means.

4. A receipt giving apparatus for use by a depositor in combination with data selectable by said depositor from a plurality of data and including image recording and issuing means comprising: deposit acceptance means disposed on said apparatus for receiving a deposit from said depositor; means for guiding the deposit from the acceptance means to a storage receptacle which is disposed inaccessible to the depositor; predetermined multiple choice data displayed for viewing by said depositor; means cooperating with said selectable data to enable the depositor to indicate the selected data from said plurality of data; said image recording means disposed to view the deposit received from the depositor and the selected data; control means actuating said recording means to record on a photographic medium an image of said deposit and of said selected data in identifiable relationship with one another, and said image issuing means rendering a receipt to the depositor in response to an image of said deposit and of the selected data having been recorded, said receipt bearing an image of the deposit and of the information selected by the depositor as viewed by said recording means.

5. A receipt giving apparatus for use by a depositor in combination with data selectable by said depositor from a plurality of data and including image recording and issuing means comprising: deposit acceptance means disposed on said apparatus for receiving a deposit from said depositor; means for guiding the deposit from the acceptance means to a storage receptacle which is disposed inaccessible to the depositor, predetermined multiple choice data displayed inside the apparatus and visible to the depositor from the exterior of the apparatus; means cooperating with said selectable data to enable the depositor to indicate the selected data from said plurality of data; said image recording means disposed to view the deposit received from the depositor and the selected data; control means actuating said recording means to record an image of said deposit and of said selected data in identifiable relationship with one another, and said image issuing means rendering a receipt to the depositor in response to an image of said deposit and of the selected data having been recorded, said receipt bearing an image of the deposit and of the information selected by the depositor as viewed by said recording means.

6. A receipt giving apparatus for use by a depositor in combination with data selectable by said depositor from a plurality of data and including image recording and issuing means comprising: deposit acceptance means disposed on said apparatus for receiving money from said depositor; means for guiding the money from the acceptance means to a storage receptacle which is disposed inaccessible to the depositor; predetermined multiple choice data displayed for viewing by said depositor; control means cooperating with said selectable data to enable the depositor to indicate the selected data from said plurality of data; said image recording means disposed to view the money and the selected data; control means actuating said recording means to record an image of said money and of said selected data in identifiable relationship with one another, and said image issuing means rendering a receipt to the depositor in response to an image of said money and of the selected data having been recorded, said receipt bearing an image of the money and of the information selected by the depositor as viewed by said recording means.

7. A receipt giving apparatus for use by a depositor in combination with data selectable by said depositor from a plurality of data and including image recording and issuing means comprising: deposit acceptance means disposed on said apparatus for receiving a negotiable instrument from said depositor; means for guiding the negotiable instrument from the acceptance means to a storage receptacle which is disposed inaccessible to the depositor; predetermined multiple choice data displayed for viewing by said depositor; control means cooperating with said selectable data to enable the depositor to indicate the selected data from said plurality of data; said image recording means disposed to view the negotiable instrument and the selected data; control means actuating said recording means to record an image of said negotiable instrument and of said selected data in identifiable relationship with one another, and said image issuing means rendering a receipt to the depositor in response to an image of said negotiable instrument and of the selected data having been recorded, said receipt bearing an image of the negotiable instrument and of the information selected by the depositor as viewed by said recording means.

8. A receipt giving apparatus for use by a depositor comprising: image recording and issuing means; information selectable by said depositor disposed for viewing by said recording means; money acceptance means disposed on said apparatus for receiving money for deposit from said depositor and bringing the deposited money in view of said recording means; means causing operation of said image recording and issuing means to provide a recorded image of said selected information and of the money in associated identifiable relationship with one another, and said image recording and issuing means rendering to said depositor an image exhibiting a pictorial record of said deposited money and of the information selected by said depositor.

References Cited in the file of this patent

UNITED STATES PATENTS

| | | |
|---|---|---|
| 2,210,472 | Strotmann | Aug. 6, 1940 |
| 2,218,656 | Pifer | Oct. 22, 1940 |
| 2,796,812 | Koci | June 25, 1957 |